United States Patent
Akiyama et al.

[11] 3,984,383
[45] Oct. 5, 1976

[54] SULFENAMIDES IN VULCANIZABLE RUBBER COMPOSITION

[75] Inventors: Tsuneharu Akiyama, Akishima; Sakae Inoue, Kodaira; Kinji Masuda, Higashi-Murayama; Suminobu Kurahashi, Yokohama, all of Japan

[73] Assignee: Bridgestone Tire Company Limited, Tokyo, Japan

[22] Filed: May 1, 1973

[21] Appl. No.: 356,168

[30] Foreign Application Priority Data

May 10, 1972 Japan.............................. 47-46081

[52] U.S. Cl. .................... 260/79.5 B; 260/79.5 C; 260/239 R; 260/514 R; 260/551 R; 260/784; 260/785; 260/791; 260/798; C08D/9/00
[51] Int. Cl.² ................... C08C 11/60; C08C 11/54
[58] Field of Search .................. 260/79.5 A, 79.5 B, 260/775, 780, 783, 795, 785, 798, 791, 784

[56] References Cited
UNITED STATES PATENTS

| | | | |
|---|---|---|---|
| 2,460,393 | 2/1949 | Paul .................................. | 260/79.5 |
| 3,513,139 | 5/1970 | Coran ................................ | 260/79.5 |
| 3,671,503 | 6/1972 | Schubart ........................... | 260/79.5 B |
| 3,689,467 | 9/1972 | Boustany ........................... | 260/79.5 B |

*Primary Examiner*—Christopher A. Henderson, Jr.
*Attorney, Agent, or Firm*—Stevens, Davis, Miller & Mosher

[57] ABSTRACT

A vulcanizable rubber composition suitable for the production of rubber materials having improved scorching stability and heat aging resistance can be obtained by compounding raw material rubber with a sulfenamide compound having the following general formula

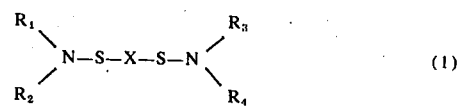
(1)

wherein X represents a residue selected from the group consisting of residues of hydrocarbon, alkyl ether and secondary alcohol having 2-20 carbon atoms, and residues represented by the general formulae

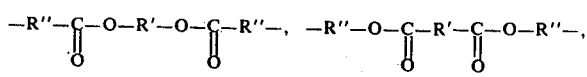

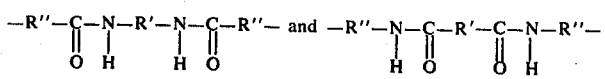

(wherein R' represents a residue of hydrocarbon or alkyl ether having 0–20 carbon atoms, and R" represents a hydrocarbon residue having 1–10 carbon atoms), and $R_1$, $R_2$, $R_3$ and $R_4$ are same or different and are selected from hydrocarbon residues having 2–10 carbon atoms, and hydrogen atom, or $R_1$ is ringed with $R_2$ and/or $R_3$ is ringed with $R_4$, through the nitrogen atom of the general formula (1), to form heterocyclic rings of 5–7 members.

7 Claims, 1 Drawing Figure

SULFENAMIDES IN VULCANIZABLE RUBBER COMPOSITION

BACKGROUND OF THE INVENTION

1. Field of the Invention

The present invention relates to a vulcanizable rubber composition suitable for the production of rubber materials having excellent scorching stability and heat aging resistance.

2. Description of the Prior Art

The heat aging resistance of rubber material has hitherto been improved by using a small amount of sulfur and a vulcanizing accelerator, such as benzothiazylsulfenamide, in an amount of more than the amount to be ordinarily used as a vulcanizing accelerator. However, such system is slow in the vulcanization velocity and further is apt to contaminate the resulting vulcanized rubber. Furthermore, it is well known that in order to attain the above described object, sulfur is wholly or partly replaced with sulfur donor or organic sulfur compound which can be reacted with rubber. For example, a method, wherein rubber is vulcanized by using tetramethylthiuram disulfide or dithiol without using sulfur, has hitherto been proposed. However, these compounds are apt to cause premature cure, scorching or bloom in the processing and molding steps of rubber. Among the conventional organic sulfur donors, N,N'-dithiomorpholine is most effective against premature curing and scorching. However, the vulcanized rubber composition containing N,N'-dithiomorpholine still has various problems to be improved. The N,N'-dithiomorpholine is represented by the chemical formula while, the sulfenamide compound according to the present invention has a group X selected from the group consisting of residues of hydrocarbon, alkyl ether and secondary alcohol having 2-20 carbon atoms and residues represented by the general formulae between adjacent two sulfur atoms, and typical compound of the sulfenamide compound is, for example, 1,4-bis(morpholinothio)benzene having a chemical formula It has never hitherto been known that such sulfenamide compound is effective as a vulcanizing agent, a vulcanizing accelerator or a stabilizer.

SUMMARY OF THE INVENTION

The object of the present invention is to provide a vulcanizable rubber composition suitable for the production of rubber materials having excellent scorching stability and heat aging resistance.

The present invention relates to a vulcanizable rubber composition suitable for the production of rubber materials having excellent scorching stability and heat aging resistance which comprises raw material rubber and a sulfenamide compound having the following general formula wherein X represents a residue selected from the group consisting of residues of hydrocarbon, alkyl ether and secondary alcohol having 2–20 carbon atoms, and residues represented by the general formulae (wherein R' represents a residue of hydrocarbon or alkyl ether having 0–20 carbon atoms, and R" represents a hydrocarbon residue having 1–10 carbon atoms), and $R_1$, $R_2$, $R_3$ and $R_4$ are same or different and are selected from hydrocarbon residues having 2–10 carbon atoms, and hydrogen atom, or $R_1$ is ringed with $R_2$ and/or $R_3$ is ringed with $R_4$, through the nitrogen atom of the general formula (1), to form heterocyclic rings of 5–7 members.

Further, the present invention relates to a vulcanizable rubber composition which comprises 100 parts by weight of raw material rubber and at least 0.2 part by weight of the sulfenamide compound having the above general formula (1) and at least 0.1 part by weight of sulfur or organic sulfur. The upper limit of the sulfenamide compound of the present invention and that of sulfur or organic sulfur are not particularly limited. However, proper ranges of the compounding amounts of the sulfenamide compound and sulfur or organic sulfur compound in the practical use can be naturally determined depending upon the purpose for improving the scorching, cross linking property or heat aging resistance of rubber composition. When the sulfenamide compound of the present invention is compounded to raw material rubber together with sulfur or organic sulfur compound, and the resulting vulcanizable rubber composition is vulcanized, rubber materials having more improved scorching stability and remarkably excellent heat aging resistance can be obtained.

As described above, since rubber materials produced from the rubber composition of the present invention are excellent in the scorching stability and heat aging resistance, the rubber materials are suitable as a rubber material for tire and other industrial rubber materials.

Figure 1:
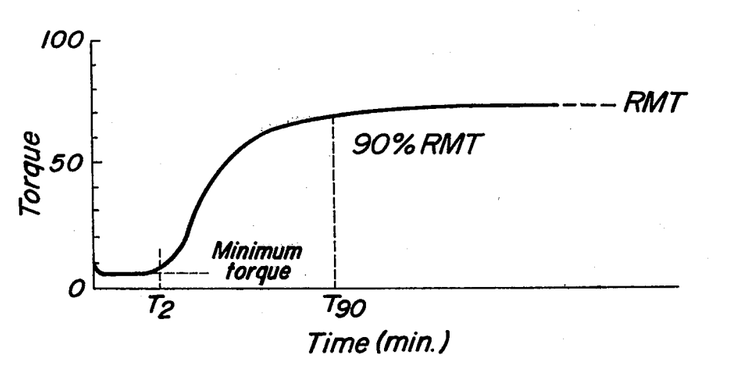
The single FIGURE shows one embodiment of vulcanization curves showing vulcanizing properties, measured by means of an oscillating disc-rheometer made by Monsanto Co., of the rubber composition prepared by using the sulfenamide compound according to the present invention.

The ordinate shows torque corresponding to cross-linking density or modulus of vulcanized rubber, and RMT is the maximum torque. The abscissa shows time, and $T_2$ is the time (minute) required until a torque increases by 2 units of the minimum torque, and $T_{90}$ is the time (minute) required until a torque reaches 90% of the maximum torque.

DESCRIPTION OF THE PREFERRED EMBODIMENT

In the sulfenamide compound having the general formula

(1)

according to the present invention, the group X represents a hydrocarbon residue (A), an alkyl ether residue (B) or a secondary alcohol residue (C) having 2–20 carbon atoms, or a residue selected from the residues represented by the general formulae (D), (E), (F) and (G)

wherein R' represents a hydrocarbon residue or an alkyl ether residue having 0–20 carbon atoms, and R'' represents a hydrocarbon residue having 1–10 carbon atoms, and $R_1$, $R_2$, $R_3$ and $R_4$ are same or different and are selected from hydrocarbon residues having 2–10 carbon atoms, and hydrogen atom, or $R_1$ is ringed with $R_2$ and/or $R_3$ is ringed with $R_4$, through the nitrogen atom of the general formula (1), to form heterocyclic rings of 5–7 members containing atoms selected from carbon, nitrogen, sulfur and oxygen atoms.

The hydrocarbon residue (A) having 2–20 carbon atoms includes residues of ethane, propane, butane, pentane, hexane, heptane, octane, nonane, decane, undecane and dodecane, residues of cyclohexane and its derivatives, residues of benzene, naphthalene and their derivatives, and residues of aralkyl hydrocarbons, such as xylene, etc. Among them, residues of ethane, propane, butane, pentane, hexane, octane, decane, benzene, naphthalene and xylene are particularly preferable.

The alkyl ether residue (B) having 2–20 carbon atoms includes residues of dimethyl ether, diethyl ether, 1,2-diethoxyethane, diethylformal and diisopropyl ether. Among them, residues of diethyl ether, diethylformal, diisopropyl ether and 1,2-diethoxyethane are particularly preferable.

The secondary alcohol residue (C) having 2–20 carbon atoms includes residues of 2-propanol and the like.

The sulfenamide compound having the general formula (1), wherein the group X is the residue (A), (B) or (C), can be prepared by an ordinarily known method. That is, a corresponding dithiol is reacted with a halogenating agent, such as halogen gas or N-chlorosuccinimide, in a solvent, such as anhydrous benzene or toluene, and the resulting sulfenyl chloride is reacted with a primary or secondary amine.

The sulfenamide compound having the general formula (1), wherein the group X is the residue represented by the general formula (D), is prepared in the following manner. A dihydric alcohol having the general formula HO—R'—OH is reacted with a mercaptan carboxylic acid having the general formula HS-R''-COOH, the resulting dithiol is reacted with a halogenating agent, and the resulting sulfenyl chloride is further reacted with a primary or secondary amine.

The dihydric alcohol to be used in the above reaction includes ethylene glycol, propylene glycol, butane diol, pentane diol, neopentyl glycol, hexylene glycol, diethyleneformal, dipropylene glycol, triethylene glycol, methyl-propylpropane diol, 1,4-cyclohexane diol, xylene diol, 1,10-decane diol and 1,12-dodecane diol. The mercaptan carboxylic acid includes thioglycollic acid, thiopropionic acid and orthothiosalycilic acid. Among these compounds, as the dihydric alcohol, ethylene glycol, propylene glycol, butane diol, pentane diol, neopentyl glycol, hexylene glycol, dipropylene glycol and triethylene glycol, and as the mercaptan carboxylic acid, thioglycollic acid and thiopropionic acid are particularly preferable.

The sulfenamide compound having the general formula (1), wherein the group X is the residue represented by the general formula (E), can be prepared in the following manner. A dibasic carboxylic acid, such as oxalic acid, malonic acid, succinic acid, glutaric acid, adipic acid, sebacic acid, maleic acid, fumaric acid, phthalic acid, isophthalic acid, terephthalic acid or itaconic acid, an acid halide thereof or a diester thereof, or a carboxylic acid anhydride, such as maleic anhydride, phthalic anhydride or cyclohexane-1,2-dicarboxylic anhydride, is reacted with a compound having both of thiol group and hydroxyl group, such as 2-mercaptoethanol, to prepare a dithiol, the resulting dithiol is reacted with a halogenating agent to prepare a sulfenyl chloride, which is further reacted with a primary or secondary amine. In the reaction, as the dibasic carboxylic acid, acid halide thereof and diester thereof, use is preferably made of oxalic acid, succinic acid, adipic acid, phthalic acid, isophthalic acid, and terephthalic acid, acid halides thereof and diesters thereof. As the carboxylic acid anhydride, phthalic anhydride is preferably used.

The sulfenamide compound having the general formula (1), wherein the group X is the residue represented by the general formula (F), can be prepared in the following manner. A difunctional amine, such as ethylenediamine, trimethylenediamine, tetramethylenediamine, hexamethylenediamine, bis(2-aminoethyl) ethyl, N,N'-bisaminopropylpiperazine, phenylenediamine, benzidine, 4,4'-methylenedianiline, o-tolidine, 3,3'-dichlorobenzidine, 3,3'-dichloro-4,4'-diaminodiphenylmethane, 4,4'-diaminodiphenyl ether, 2,4-toluenediamine, or 1,3-xylylenediamine, is reacted with a chlorocarboxylic acid, such as chloroacetic acid, α-chloropropionic acid, β-chloropropionic acid, 5-chlorovaleric acid, and ammonium rhodanate, and the resulting product is hydrolyzed to prepare a dithiol, and the resulting dithiol is reacted with a halogenating agent to prepare a sulfenyl chloride, which is further reacted with a primary or secondary amine. As the difunctional amino compound to be used in the above reaction, ethylenediamine, hexamethylenediamine, 4,4'-methylenedianiline and 3,3'-dichloro-4,4'-diaminodiphenylmethane are particularly preferable, and as the chlorocarboxylic acid, α-chloropropionic acid and β-chloropropionic acid are particularly preferable.

The sulfenamide compound having the general formula (1), wherein the group X is the residue represented by the general formula (G), is prepared in the following manner. An acid halide or a diester of dibasic carboxylic acids, such as oxalic acid, malonic acid, succinic acid, glutaric acid, adipic acid, sebacic acid, maleic acid, fumaric acid, phthalic acid, isophthalic acid, terephthalic acid and itaconic acid, is reacted with a compound having both of thiol group and amino group, such as 2-mercaptoethylamine, to prepare a dithiol, the resulting diethiol is reacted with a halogenating agent to prepare, for example, a sulfenyl chloride, which is further reacted with a primary or secondary amine. As the dibasic carboxylic acid to be used in the above reaction, oxalic acid, succinic acid, adipic acid, phthalic acid, isophthalic acid and terephthalic acid are particularly preferable.

The groups $R_1$, $R_2$, $R_3$ and $R_4$ representing hydrocarbon residues having 2–10 carbon atoms and hydrogen atoms include residues of ethane, propane, butane, pentane, hexane, cyclohexane and their derivatives, benzyl group and hydrogen atom. Among them, residues of ethane, propane, butane, cyclohexane and benzene are particularly preferable.

The heterocyclic ring of 5–7 members containing atoms selected from carbon, nitrogen, sulfur and oxygen atoms, which is formed by $R_1$ and $R_2$ and/or $R_3$ and $R_4$, includes morpholino group, dimethylmorpholino group, pyrrolidinyl group, piperidino group, 2-pipecolyl group, pyrrolyl group, carbazolyl group 6-ethoxy-2,2,4-trimethyl-1,2-dihydroquinolyl group, phenothiazyl group, imidazolyl group, benzimidazolyl group, phthalimido group, succinimido group, maleimido group and ε-caprolactam group. Among these groups, morpholino group, dimethylmorpholino group, carbazolyl group, phenothiazyl group, phthalimido group, succinimido group, maleimido group and ε-caprolactam group are particularly preferable.

The sulfenamide compound, according to the present invention is compounded into raw material rubber alone or together wih sulfur or organic sulfur compound. In the practical production of rubber material, the vulcanizing agent may be used together wih ordinarily used compounding agents, such as vulcanizing activator, accelerator, filler, softener, plasticizer, antioxidant and other processing aid. In this case, the vulcanizing agent may be used in admixture with the ordinarily used compounding agent or kneaded after the blending of all other additives has been completed.

The term "raw material rubber" used in the present invention includes vulcanizable rubbers, such as natural rubber, styrene-butadiene copolymeric butadiene copolymeric rubber, polybutadiene rubber, polyisoprene rubber, acrylonitrile rubber, chloroprene rubber, isobutylene rubber and isoprene coopolymeric terpolymer, and blends thereof.

The sulfenamide compound of the present invention is compounded into raw material rubber in an amount of at least 0.2 part by weight based on 100 parts by weight of the raw material rubber. When the amount is less than 0.2 part by weight, an effect as a vulcanizing agent does not appear, and the object of the present invention cannot be attained. The upper limit of the amount to be compounded is not particularly limited, but even when more than 15 parts by weight of the sulfenamide compound is compounded, a vulcanizing effect over a certain extent cannot be expected. Accordingly, the compounding amount of the sulfenamide compound is usually 0.2–15 parts by weight, preferably 1.0–8.0 parts by weight, based on 100 parts by weight of raw material rubber.

When the sulfenamide compound of the present invention is used together with sulfur or organic sulfur vulcanizing agent, the amount of sulfur or organic sulfur compound is 0.1–6.0 parts by weight, preferably 0.2–4.0 parts by weight, based on 100 parts by weight of raw material rubber. When a vulcanizable rubber composition prepared by using the sulfenamide compound according to the present invention together with the above described amount of sulfur or organic sulfur vulcanizing agent is vulcanized, rubber materials having more improved scorching stability and remarkably excellent heat aging resistance can be obtained.

The following Examples are given for the purpose of illustration of this invention and are not intended as limitations thereof.

PREPARATION EXAMPLE 1

Synthesis of 1,4-bis(morpholinothio)benzene

A. Synthesis of 1,4-benzene dithiol:

173 g of p-aminobenzenesulfonic acid was dissolved in a 2N—$Na_2CO_3$ aqueous solution and further 250 g of conc. HCl was added thereto, and then the temperature was lowered to about 5°C. Next, 350 cc of a 20% $NaNO_2$ aqueous solution was dropped under cooling, and thereafter the stirring was continued for 30 minutes. The resulting diazo compound was filtered with suction and washed with cold water and further with cold methanol. Then, this compound was made into a 30% methanol solution and added to a 30% $K_2S$ methanol solution at 30°–40°C little by little while stirring, during which the generation of nitrogen gas was observed. After the generation of nitrogen gas was completed, the resulting solution was filtered and the residue was washed with methanol to obtain p-sulfenyl potassium-potassium benzenesulfonate. Next, the obtained p-sulfenyl potassium-potassium benzenesulfonate was pulverized, and thereafter 138.1 g (0.52 mol) of the resulting powder was placed in a flask and 130 g (0.64 mol) of $PCl_5$ was added thereto little by little while stirring. The flask was provided with a reflux condenser and the resulting solution was maintained at 100°C for 30 minutes. The by-produced $POCl_3$ was removed off and the residue was extracted with chloroform. Then, p-mercaptobenenesulfonyl chloride was recovered from the extracted chloroform layer. 100 g (0.48 mol) of the thus obtained p-mercaptobenzenesulfonyl chloride was placed in a flask and 900 g (3.0 mol) of a 33% $H_2SO_4$ aqueous solution was added thereto and further 150 g of Zn amalgam was added at room temperature while stirring. The resulting solution was refluxed for 6 hours and left to stand over a night. Then, a mixture of dithiol crystal and zinc powder was dissolved in an NaOH aqueous solution, and the zinc powder was filtered and separated, and the filtrate was poured in an excess of HCl aqueous solution to precipitate the dithiol crystal. The resulting crystal was filtered and washed with water to obtain 1,4-benzene dithiol.

B. Synthesis of 1,4-bis(morpholinothio)benzene from 1,4-benzene dithiol:

47 g (0.334 mol) of 1,4-benzene dithiol was made into a 30% benzene solution, and then the resulting solution was added dropwise to a solution of 91 g (0.674 mol) of N-chlorosuccinimide in 300 cc of anhydrous benzene at a temperature below 10°C. The resulting sulfenylchloride solution was separated from the by-produced succinimide and 118 g (0.674 mol) of morpholine was added dropwise thereto at a temperature below 10°C. The by-produced morpholine hydrochloride was filtered off and the filtrate was distilled to remove benzene, by which a crude crystal of 1,4-bis(morpholinothio)benzene was obtained. This crude crystal was recrystallized and purified from ethanol. The purified crystal had a melting point of 95°C, and the yield was 70%. It was identified from NMR, IR and elementary analysis that the crystal is 1,4-bis(morpholinothio)benzene.

PREPARATION EXAMPLE 2

Synthesis of 1,10-bis(phthalimidothio)decane 32.3 g (0.243 mole) of N-chlorosuccimide was dissolved in 150 ml of anhydrous n-pentane and then 25 g (0.121 mol) of 1,10-decane thiol was added thereto dropwise at 0°C–5°C while stirring. After the completion of the reaction, the by-produced succinimide was filtered off and the filtrate was added dropwise to a solution of 120 ml of dimethylformamide, 35.75 g (0.243 mol) of phthalimide and 33.13 g (0.328 mol) of triethylamine in 30 minutes. After the completion of the reaction, the resulting solution was poured in 2 l of cold water to precipitate a crystal of 1,10-bis(phthalimidothio)decane. Then, this crystal was recrystallized from benzene. It was confirmed from NMR, IR and elementary analysis that the crystal is 1,10-bis(phthaliminothio)decane.

PREPARATION EXAMPLE 3

Synthesis of ethylene di-β(morpholinothio)propionate

In a flask were charged 129.5 g (1.22 mol) of β-mercaptopropionic acid, 25.22 g (0.407 mol) of ethylene glycol and 7.97 g (0.081 mol) of conc. $H_2SO_4$, and then the resulting solution was further stirred at 110°C for 3 hours. The solution was neutralized with a saturated aqueous solution of $NaHCO_3$ and extracted with benzene. The extracted benzene layer was washed with water and dehydrated on $MgSO_4$ and then distilled to obtain ethylene di-β(mercapto) propionate (145°–150°c/1 mmHg). The resulting ethylene di-β(mercapto)propionate was sulfenylchlorinated and reacted with morpholine in the same manner as described in Preparation Example 1 to obtain ethylene di-β-(morpholinothio) propionate.

PREPARATION EXAMPLE 4

Synthesis of di-β-(morpholinothio)ethyl adipate 50g (0.273 mol) of adipic acid chloride was added dropwise to 48 g (0.55 mol) of 2-mercaptoethanol at 0°–5°C in a nitrogen stream while stirring. Thereafter, the temperature was gradually raised up to 40°C so as to complete the reaction. The reaction product was extracted with benzene, washed with water, dehydrated on $MgSO_4$ and distilled to obtain di-β-mercaptoethyl adipate (147°C/1 mmHg). The resulting di-β-mercaptoethyl adipate was sulfenylchlorinated and reacted with morpholine in the same manner as described in Preparation Example 1 to obtain di-β-(morpholinothio)ethyl adipate.

EXAMPLE 1

To 100 parts of natural rubber or SBR-1500 (emulsion polymerization; styrene-butadiene copolymer containing 23.5% of styrene) were compounded 1,4-bis(morpholinothio)benzene and other compounding ingredients in an amount as shown in the following Table 1. The resulting rubbery composition was vulcanized. For the comparison, the above procedure was repeated except that 1,4-bis(morpholinothio) benzene was not used. The vulcanizing properties were measured with respect to each rubbery composition to obtain a result as shown in Table 1.

Table 1

| Experiment No. | 1 | 2 | 3 | 4 | 5 (Comparative No.) | 6 (Comparative No.) |
|---|---|---|---|---|---|---|
| Compounding recipe (part) | | | | | | |
| Natural rubber | 100 | 100 | 100 | — | 100 | — |
| SBR-1500 | — | — | — | 100 | — | 100 |
| ZnO | 4.0 | 4.0 | 4.0 | 4.0 | 4.0 | 4.0 |
| Stearic acid | 2.0 | 2.0 | 2.0 | 2.0 | 2.0 | 2.0 |
| Accelerator* | 0.8 | 0.8 | 0.8 | 0.8 | 0.8 | 0.8 |
| 1,4-bis(morpholino-thio)benzene | 4.0 | 8.0 | 12.0 | 4.0 | — | — |
| Result: Rheometer(180°C) | | | | | | |
| Minimum torque | 2.0 | 2.0 | 2.0 | 4.0 | 2.0 | 4.0 |
| RMT | 19.5 | 21.0 | 21.0 | 47.1 | 2.0 | 5.0 |
| $T_2$ (min.) | 15.0 | 20.0 | 32.0 | 6.0 | >60 | >60 |
| | vulcanized | vulcanized | vulcanized | vulcanized | not vulcanized | not vulcanized |

*N-oxydiethylene-2-benzothiazole sulfenamide

As seen from Table 1, the comparative experiments containing no 1,4-bis(morpholinothio)benzene cannot provide vulcanizates, while a remarkable rise of torque value is found in the experiment Nos. 1–4 containing 1,4-bis(morpholinothio)benzene. From this point, it is clear that 1,4-bis(morpholinothio)benzene sufficiently fulfills its function as a vulcanizing agent for rubber.

The amount of 1,4-bis(morpholinothio)benzene added influences on RMT, which corresponds to the cross-linking density or modulus of the rubbery composition, and RMT rises as the said compound increases in the amount of from 4 parts to 8 parts, but the effect by addition of the compound remains unchanged even if the addition amount increases up to 12 parts. On the other hand, $T_2$ is apt to increase with the increase of the addition amount.

EXAMPLE 2

To 100 parts of natural rubber was compounded 1,4-bis(morpholinothio)benzene or a mixture of said compound and sulfur or tetramethylthiuram disulfide (TMTD) as an organic sulfur compound in an amount as shown in the following Table 2. The resulting rubbery composition was vulcanized. For the composition, the above procedure was repeated except that only TMTD was added as a vulcanizing agent. The vulcanizing properties were measured with respect to each rubbery composition to obtain a result as shown in Table 2.

Table 2

| Experiment No. | 1 | 2 | 3 | 4 | 5 | 6 | 7 |
|---|---|---|---|---|---|---|---|
| Compounding recipe (part) | | | | | | | |
| Natural rubber | 100 | 100 | 100 | 100 | 100 | 100 | 100 |
| ZnO | 5 | 5 | 5 | 5 | 5 | 5 | 5 |
| Stearic acid | 2 | 2 | 2 | 2 | 2 | 2 | 2 |
| Accelerator *1 | 1 | 1 | 1 | 1 | 1 | 1 | 1 |
| 1,4-bis(morpholino-thio)benzene | 4 | 4 | 4 | 4 | 4 | 4 | 4 |
| Sulfur | — | 0.2 | 0.4 | 0.6 | 0.8 | 1.2 | 1.6 |
| Organic sulfur *2 vulcanizing agent | | | | | | | |
| Result: Rheometer(150°C) | | | | | | | |
| Minimum torque | 2 | 2 | 2 | 2 | 2 | 2 | 2 |
| RMT | 20 | 34 | 42 | 50 | 57 | 61 | 68 |
| $T_2$ (min.) | 54 | 55 | 36 | 28 | 26 | 20 | 20 |
| $T_{90}$ (min.) | 80 | 80 | 58 | 47 | 41 | 34 | 29 |

| Experiment No. | 8 | 9 | 10 | 11 | 12 | 13 | 14 (Comparative No.) |
|---|---|---|---|---|---|---|---|
| | | (Comparative No.) | | | | | |
| Compounding recipe (part) | | | | | | | |
| Natural rubber | 100 | 100 | 100 | 100 | 100 | 100 | 100 |
| ZnO | 5 | 5 | 5 | 5 | 5 | 5 | 5 |
| Stearic acid | 2 | 2 | 2 | 2 | 2 | 2 | 2 |
| Accelerator *1 | 1 | 1 | 1 | 1 | 1 | — | — |
| 1,4-bis(morpholino-thio)benzene | 4 | — | — | — | — | 4 | — |
| Sulfur | 2.0 | 0.2 | 0.4 | 1.0 | 2.0 | — | — |
| Organic sulfur *2 vulcanizing agent | | | | | | 1 | 1 |
| Result: Rheometer(150°C) | | | | | | | |
| Minimum torque | 2 | 4 | 4 | 5 | 6 | 5.0 | 6.0 |
| RMT | 72 | 15 | 22 | 35 | 51 | 42.0 | 40 |
| $T_2$ (min.) | 18 | 6 | 3 | 2 | 1 | 15 | 3 |
| $T_{90}$ (min.) | 26 | 20 | 11 | 7 | 6 | 28 | 6 |

*1 mercaptobenzothiazole
*2 TMTD

In the experiment Nos. 1–8, $T_2$ measured by means of the rheometer is very high. This shows that scorching stability is high. Furthermore, even if the amount of sulfur used together with 1,4-bis(morpholinothio)benzene increases from 0.2 part to 2.0 parts, $T_2$ is very long and indicates the high scorching stability as compared with the comparative experiment Nos. 9–12 using only sulfur as the vulcanizing agent. Moreover, as seen from the experiment No. 13 and the comparative experiment No. 14, the scorching stability is considerably improved by using TMTD together with 1,4-bis(morpholinothio)benzene as the vulcanizing agent.

From the results of Examples 1 and 2, it can be seen that the sulfenamide compounds according to the present invention themselves are able to vulcanize rubber as the vulcanizing agent but they can achieve a particularly improved scorching stability and a high cross-linking density when they are used together with sulfur or organic sulfur compound.

EXAMPLE 3

To natural rubber were compounded conventional compounding ingredients and further 17 kinds of sulfenamide compounds according to the present invention were added thereto. The effect of adding said compound was measured by means of an oscillating rheometer made by Monsanto Co. at a temperature of 150°C to obtain a result as shown in the following Table 3.

Table 3

| Experiment No. | 1 | 2 | 3 | 4 | 5 | 6 | 7 | 8 | 9 | 10 |
|---|---|---|---|---|---|---|---|---|---|---|
| Compounding recipe (part) | | | | | | | | | | |
| Natural rubber | 100 | 100 | 100 | 100 | 100 | 100 | 100 | 100 | 100 | 100 |
| ISAF carbon black | 45 | 45 | 45 | 45 | 45 | 45 | 45 | 45 | 45 | 45 |
| ZnO | 5 | 5 | 5 | 5 | 5 | 5 | 5 | 5 | 5 | 5 |
| Accelerator*1 | 1 | 1 | 1 | 1 | 1 | 1 | 1 | 1 | 1 | 1 |
| Antioxidant*2 | 1.5 | 1.5 | 1.5 | 1.5 | 1.5 | 1.5 | 1.5 | 1.5 | 1.5 | 1.5 |
| Stearic acid | 2 | 2 | 2 | 2 | 2 | 2 | 2 | 2 | 2 | 2 |
| Aromatic oil | 6 | 6 | 6 | 6 | 6 | 6 | 6 | 6 | 6 | 6 |
| Sulfur | 0.4 | 0.4 | 0.4 | 0.4 | 0.4 | 0.4 | 0.4 | 0.4 | 0.4 | 0.4 |
| Organic sulfur vulcanizing*3 agent | | | | | | | | | | |
| 1,10-bis(morpholinothio)decane | 4 | | | | | | | | | |
| 1,10-bis(N,N'-diethylaminothio)decane | | 4 | | | | | | | | |
| 1,10-bis(N,N'-dicyclohexylaminothio)decane | | | 4 | | | | | | | |
| 1,10-bis(phthaliminothio)decane | | | | 4 | | | | | | |
| 1,10-bis(succiniminothio)decane | | | | | 4 | | | | | |
| 1,4-bis(morpholinothio)benzene | | | | | | 4 | | | | |
| 1,3-bis(morpholinothio)benzene | | | | | | | 4 | | | |
| 1,4-bis(phenylaminothio)benzene | | | | | | | | 4 | | |
| 1,4-bis(dimethylmorpholinothio)benzene | | | | | | | | | 4 | |
| 1,5-bis(morpholinothio)naphthalene | | | | | | | | | | 4 |
| bis(N,N'-diethylaminothio)paraxylene | | | | | | | | | | |
| 2,2'-bis(morpholinothio)ethyl ether | | | | | | | | | | |
| 2,2'-bis(carbazolylthio)ethyl ether | | | | | | | | | | |
| 2,2'-bis(phenothiazylthio)ethyl ether | | | | | | | | | | |
| 2,2'-bis(ε-caprolactamthio)ethyl ether | | | | | | | | | | |
| ethylene-β-(morpholinothio)propionate | | | | | | | | | | |
| di-β-(morpholinothio)ethyl adipate | | | | | | | | | | |
| Result: Rheometer (150°C) | | | | | | | | | | |
| $T_2$ (min.) | 21.0 | 11.0 | 13.2 | 23.3 | 8.6 | 11.6 | 15.0 | 13.1 | 13.1 | 9.3 |
| $T_{9\,3}$ (min.) | 23.7 | 21.1 | 28.8 | 89.0 | 41.0 | 23.8 | 31.8 | 18.8 | 28.7 | 14.4 |
| RMT | 50.0 | 41.5 | 46.0 | 47.9 | 45.7 | 57.0 | 53.4 | 42.0 | 53.9 | 54.5 |

| Experiment No. | 11 | 12 | 13 | 14 | 15 | 16 | 17 | 1 (Comparative No.) | 2 (Comparative No.) | 3 (Comparative No.) |
|---|---|---|---|---|---|---|---|---|---|---|
| Compounding recipe (part) | | | | | | | | | | |
| Natural rubber | 100 | 100 | 100 | 100 | 100 | 100 | 100 | 100 | 100 | 100 |
| ISAF carbon black | 45 | 45 | 45 | 45 | 45 | 45 | 45 | 45 | 45 | 45 |
| ZnO | 5 | 5 | 5 | 5 | 5 | 5 | 5 | 5 | 5 | 5 |
| Accelerator*1 | 1 | 1 | 1 | 1 | 1 | 1 | 1 | 1 | 1 | 1 |
| Antioxidant*2 | 1.5 | 1.5 | 1.5 | 1.5 | 1.5 | 1.5 | 1.5 | 1.5 | 1.5 | 1.5 |
| Stearic acid | 2 | 2 | 2 | 2 | 2 | 2 | 2 | 2 | 2 | 2 |
| Aromatic oil | 6 | 6 | 6 | 6 | 6 | 6 | 6 | 6 | 6 | 6 |
| Sulfur | 0.4 | 0.4 | 0.4 | 0,4 | 0.4 | 0.4 | 1 | 2 | | 4 |
| Organic sulfur vulcanizing*3 agent | | | | | | | | | | |
| 1,10-bis(morpholinothio)decane | | | | | | | | | | |
| 1,10-bis(N,N'-diethylaminothio)decane | | | | | | | | | | |
| 1,10-bis(N,N'-dicyclohexylaminothio)decane | | | | | | | | | | |
| 1,10-bis(phthaliminothio)decane | | | | | | | | | | |
| 1,10-bis(succiniminothio)decane | | | | | | | | | | |
| 1,4-bis(morpholinothio)benzene | | | | | | | | | | |
| 1,3-bis(morpholinothio) | | | | | | | | | | |

Table 3-continued

| | | | | | | | | | | |
|---|---|---|---|---|---|---|---|---|---|---|
| benzene | | | | | | | | | | |
| 1,4-bis(phenylaminothio) benzene | | | | | | | | | | |
| 1,4-bis(dimethylmorpholinothio)benzene | | | | | | | | | | |
| 1,5-bis(morpholinothio) naphthalene | | | | | | | | | | |
| bis(N,N'-diethylaminothio) paraxylene | 4 | | | | | | | | | |
| 2,2'-bis(morpholinothio)ethyl ether | | 4 | | | | | | | | |
| 2,2'-bis(carbazolythio) ethyl ether | | | 4 | | | | | | | |
| 2,2'-bis(phenothiazylthio) | | | | 4 | | | | | | |
| 2,2'-bis(ε-caprolactamthio) ethyl ether | | | | | 4 | | | | | |
| ethylene-β-(morpholinothio) propionate | | | | | | 4 | | | | |
| di-β-(morpholinothio) ethyl adipate | | | | | | | 4 | | | |
| Result: Rheometer (150°C) | | | | | | | | | | |
| $T_2$ (min.) | 10.0 | 10.3 | 9.1 | 9.6 | 4.3 | 5.2 | 9.5 | 4.0 | 3.3 | 2.3 |
| $T_{93}$ (min.) | 21.3 | 17.5 | 50.5 | 24.8 | 38.0 | 11.5 | 17.0 | 12.6 | 12.0 | 7.2 |
| RMT | 47.2 | 52.5 | 42.5 | 40.1 | 44.8 | 46.2 | 43.0 | 42.2 | 56.0 | 63.0 |

*[1] mercaptobenzothiazole
*[2] N-phenyl-N'-isopropyl-p-phenylenediamine
*[3] tetramethylthiuram disulfide As seen from the results of Table 3, $T_2$ of the experiment Nos. 1–17 is considerably larger than that of the comparative experiment Nos. 2 and 3. This shows that the sulfenamide compounds according to the present invention provide an improved scorching stability.

Furthermore, even when the amount of sulfur in the experiment Nos. 1–17 is about ½ to ¼ based on the amount of sulfur in the comparative experiment Nos. 1 and 2, RMT is substantially equal. This fact shows that the compounds according to the present invention have a very high cross-linking efficiency.

EXAMPLE 4

To natural rubber or SBR 1712 (oil-extended emulsion-polymerization; styrene-butadiene rubber containing 37.5 PHR of an oil) were compounded conventional compounding ingredients and a mixture of sulfenamide compound according to the present invention and sulfur in an amount as shown in the following Table 4. The resulting rubbery composition was vulcanized.

The heat aging properties were measured with respect to the vulcanized rubber to obtain a result as shown in Table 4.

The heat aging test was carried out by means of a test tube type aging tester at 120°C for 24 hours in case of the compounded natural rubber or at 120°C for 48 hours in case of the compounded SBR. The retentions of tensile strength and elongation at break are percentages of tensile strength and elongation at break of the vulcanizate after heat aged in those of the vulcanizate before heat aging, respectively: namely, Retention of tensile strength or elongation at break $= \dfrac{\text{Tensile strength or elongation at break after heat aged}}{\text{Tensile strength or elongation at break before heat aging}} \times 100$ Therefore, the feature that the values of the retentions of tensile strength and elongation at break are large shows that the vulcanizate has an excellent heat aging resistance.

Table 4

| Experiment No. | 1 | 2 | 3 | 4 | 5 | 6 | 7 (Comparative No.) |
|---|---|---|---|---|---|---|---|
| Compounding recipe(part) | | | | | | | |
| Natural rubber | 100 | 100 | 100 | 100 | 100 | 100 | 100 |
| SBR 1712 | | | | | | | |
| ISAF carbon black | 45 | 45 | 45 | 45 | 45 | 45 | 45 |
| ZnO | 5.0 | 5.0 | 5.0 | 5.0 | 5.0 | 5.0 | 5.0 |
| Accelerator*[1] | 1.0 | 1.0 | 1.0 | 1.0 | 1.0 | 1.0 | 1.0 |
| Antioxidant*[2] | 1.5 | 1.5 | 1.5 | 1.5 | 1.5 | 1.5 | 1.5 |
| Stearic acid | 2.0 | 2.0 | 2.0 | 2.0 | 2.0 | 2.0 | 2.0 |
| Sulfur | 0.4 | 0.4 | 0.4 | 0.4 | 0.4 | 0.4 | 2.0 |
| 1,4-bis(morpholinothio) benzene | 4.0 | — | — | — | — | — | — |
| 1,10-bis(morpholinothio) decane | — | 4.0 | — | — | — | — | — |
| 2,2'-bis(morpholinothio) ethyl ether | — | — | 4.0 | — | — | — | — |
| 1,5-bis(morpholinothio) naphthalene | — | — | — | 4.0 | — | — | — |
| 1,10-bis(N,N-diethylaminothio)decane | — | — | — | — | 4.0 | — | — |
| 1,4-bis(phenylaminothio) benzene | — | — | — | — | — | 4.0 | — |
| Organic sulfur vulcanizing*[3] agent | — | — | — | — | — | — | — |
| Organic sulfur vulcanizing*[4] agent | — | — | — | — | — | — | — |
| Result | | | | | | | |
| Tensile strength (Kg/cm²) | 237 | 258 | 254 | 268 | 221 | 225 | 250 |

Table 4-continued

| | 1 | 2 | 3 | 4 | 5 | 6 | 7 |
|---|---|---|---|---|---|---|---|
| Elongation at break (%) | 590 | 600 | 620 | 620 | 620 | 600 | 580 |
| 300% modulus (Kg/cm$^2$) | 75 | 75 | 70 | 79 | 62 | 67 | 84 |
| Heat aging | | | | 120°C × 24 hours | | | |
| Tensile Strength (Kg/cm$^2$) | 196 | 216 | 213 | 203 | 181 | 187 | 144 |
| Elongation at break (%) | 580 | 510 | 570 | 650 | 580 | 550 | 290 |
| 300% modulus (Kg/cm$^2$) | 77 | 88 | 89 | 89 | 70 | 76 | — |
| Retention of tensile strength (%) | 83 | 84 | 84 | 76 | 82 | 83 | 58 |
| Retention of elongation at break (%) | 98 | 85 | 92 | 105 | 94 | 92 | 50 |

| Experiment No. | 8 | 9 | 10 | 11 | 12 | 13 | 14 | 15 (Comparative No.) |
|---|---|---|---|---|---|---|---|---|
| | (Comparative No.) | | | | | | | |
| Compounding recipe (part) | | | | | | | | |
| Natural rubber | 100 | 100 | 100 | 100 | | | | |
| SBR 1712 | | | | | 137.5 | 137.5 | 137.5 | 137.5 |
| ISAF carbon black | 45 | 45 | 45 | 45 | 50 | 50 | 50 | 50 |
| ZnO | 5.0 | 5.0 | 5.0 | 5.0 | 5.0 | 5.0 | 5.0 | 5.0 |
| Accelerator*[1] | 1.0 | 1.0 | 1.0 | 1.0 | 1.0 | 1.0 | 1.0 | 1.0 |
| Antioxidant*[2] | 1.5 | 1.5 | 1.5 | 1.5 | 1.5 | 1.5 | 1.5 | 1.5 |
| Stearic acid | 2.0 | 2.0 | 2.0 | 2.0 | 2.0 | 2.0 | 2.0 | 2.0 |
| Sulfur | — | — | — | — | 0.4 | 0.4 | 0.4 | 2.0 |
| 1,4-bis(morpholinothio)benzene | — | — | — | — | 4.0 | — | — | — |
| 1,10-bis(morpholinothio)decane | — | — | — | — | — | 4.0 | — | — |
| 2,2'-bis(morpholinothio)ethyl ether | — | — | — | — | — | — | — | — |
| 1,5-bis(morpholinothio)naphthalene | — | — | — | — | — | — | — | — |
| 1,10-bis(N,N-diethylaminothio)decane | — | — | — | — | — | — | 4.0 | — |
| 1,4-bis(phenylaminothio)benzene | — | — | — | — | — | — | — | — |
| Organic sulfur vulcanizing*[3] agent | 3.7 | 7.4 | — | — | — | — | — | — |
| Organic sulfur vulcanizing*[4] agent | — | — | 3.8 | 7.6 | — | — | — | — |
| Result | | | | | | | | |
| Tensile strength (Kg/cm$^2$) | 307 | 250 | 255 | 236 | 229 | 219 | 206 | 201 |
| Elongation at break (%) | 540 | 420 | 600 | 500 | 750 | 840 | 900 | 650 |
| 300% modulus (Kg/cm$^2$) | 125 | 166 | 78 | 105 | 43 | 36 | 25 | 51 |
| Heat aging | | | | | 120°C × 48 hours | | | |
| Tensile strength (Kg/cm$^2$) | 196 | 115 | 224 | 168 | 209 | 206 | 226 | 110 |
| Elongation at break (%) | 370 | 140 | 410 | 270 | 570 | 580 | 570 | 220 |
| 300% modulus (Kg/cm$^2$) | 154 | — | 134 | — | — | — | — | — |
| Retention of tensile strength (%) | 64 | 46 | 88 | 71 | 91 | 94 | 110 | 55 |
| Retention of elongation at break (%) | 68 | 33 | 58 | 54 | 76 | 69 | 63 | 34 |

*[1] mercaptobenzothiazole
*[2] phenylisopropyl p-phenylenediamine
*[3] N,N'-dithiomorpholine
*[4] tetramethylthiuram disulfide In Table 4, the rubber compositions of the comparative experiment Nos. 8 and 9 using N,N'-dithiomorpholine which provides an exceedingly high scorching stability among the organic sulfur vulcanizing agent are remarkably inferior in the heat aging resistance to the rubber compositions compounded with the sulfenamide compounds according to the present invention.

As seen from Examples 2, 3 and 4, the scorching stability of the vulcanizable rubbery composition is considerably improved by using sulfur together with the sulfenamide compound according to the present invention as compared with the use of conventional sulfur, organic accelerator or organic sulfur vulcanizing agent alone. And also, the heat age resistance is very excellent according to the present invention.

What is claimed is:

1. A sulfur vulcanizable rubber composition which comprises 100 parts by weight of raw material rubber containing unsaturated double bonds in the polymeric chain and at least 0.2 part by weight of a sulfenamide compound having the following general formula (1)

wherein X represents a hydrocarbon residue having 2–20 carbon atoms selected from the group consisting of aliphatic hydrocarbon residues, alicyclic hydrocarbon residues, aromatic hydrocarbon residues and aralkyl groups, and $R_1$, $R_2$, $R_3$ and $R_4$ are same or different and are selected from the group consisting of hydrocarbon resides having 2–10 carbon atoms, hydrogen, or $R_1$ is ringed with $R_2$, or $R_3$ is ringed with $R_4$, through a nitrogen atom of general formula (1), in a morpholino group, dimethylmorpholino group, carbazolyl group or phenothiazyl group.

2. The rubber composition as claimed in claim 1, which comprises 100 parts by weight of raw material rubber and 0.2–15 parts by weight of the sulfenamide compound having the general formula (1).

3. The rubber composition as claimed in claim 1, which comprises 100 parts by weight of raw material rubber, 0.2–15 parts by weight of the sulfenamide compound having the general formula (1), and 0.1–6 parts by weight of sulfur or organic sulfur compound.

4. The rubber composition as claimed in claim 1, wherein $R_1$, $R_2$, $R_3$ or $R_4$ is selected from the group consisting of: ethyl, propyl, butyl, cyclohexyl, phenyl or benzyl groups, or hydrogen.

5. The rubber composition as claimed in claim 1, wherein said aliphatic hydrocarbon residue has 2–12 carbon atoms.

6. The rubber composition as claimed in claim 1, wherein said aromatic hydrocarbon residue is the residue of benzene or napthalene.

7. The rubber composition as claimed in claim 1, said aralkyl group is xylyl group.

* * * * *